(No Model.)
C. PARENT.
HOSE COUPLING.
No. 408,256. Patented Aug. 6, 1889.
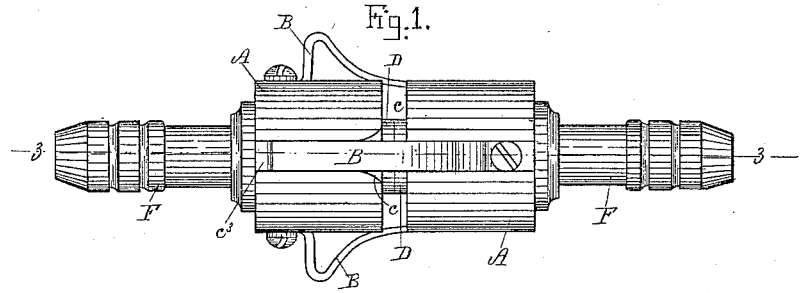
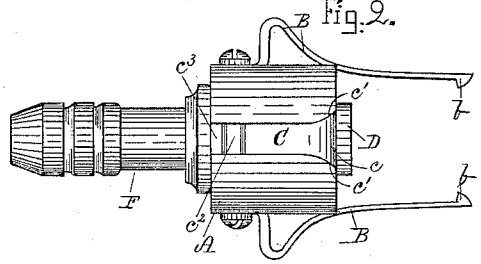
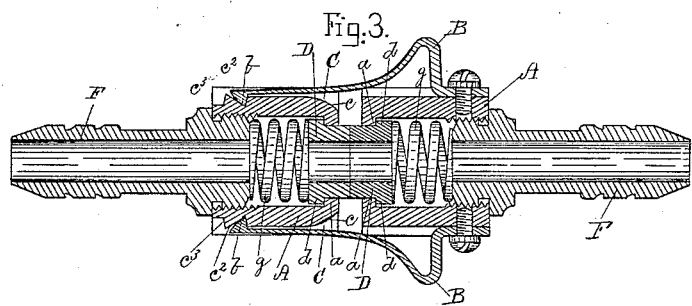
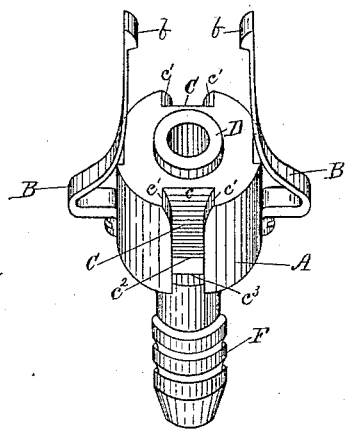
Witnesses.
Lauritz W. Möller.
Walter J. Whiston.
Inventor.
Charles Parent
by Wm. A. Copeland
his atty.

UNITED STATES PATENT OFFICE.

CHARLES PARENT, OF BOSTON, ASSIGNOR OF ONE-HALF TO CHARLES R. SAWYER, OF BRAINTREE, MASSACHUSETTS.

HOSE-COUPLING.

SPECIFICATION forming part of Letters Patent No. 408,256, dated August 6, 1889.

Application filed January 14, 1889. Serial No. 296,229. (No model.)

*To all whom it may concern:*

Be it known that I, CHARLES PARENT, of Boston, in the county of Suffolk and State of Massachusetts, have invented a new and useful Improvement in Hose-Coupling, of which the following is a specification, reference being had to the accompanying drawings, which form a part hereof.

The object of my invention is to provide a coupling specially adapted for use with my pneumatic bell-alarm described in Letters Patent No. 396,608, although my coupling may be used for other purposes. It is desirable that the air-tubes in adjoining cars in which that alarm is used shall be connected by hose between the two cars, and that the coupling of the hose shall be automatically separable when the cars break apart.

My invention relates to a coupling composed of two members exactly alike, each consisting of a shell within which is a spring-seated gasket projecting beyond the face of the shell, spring-latches attached to the outside of each shell, and grooved longitudinal guideways with beveled notches in the bottom of the grooves, all so arranged that the latches of each shell will enter the grooved guideways of the other shell and engage in the notches to lock the two members together, the gaskets thereby being compressed together to form a tight joint, the spring-catches locking in such a manner that a strong straight pull will separate the two members automatically without breaking.

In the drawings, Figure 1 is a side view of the two members united. Fig. 2 is a side view of one member detached. Fig. 3 is a longitudinal section through the spring-latches on line 3 of Fig. 1. Fig. 4 is an inner end view of one member detached.

The shell A is made hollow throughout its length and has a hollow shank F screwed into its rear end, to which the hose is attached. A spiral spring $g$, inside the shell, is seated on the inner end of the shank F, and on the outer end of this spring is seated a gasket D, preferably of india-rubber, which projects somewhat beyond the face of the shell when the spring is not compressed. This gasket fits the interior of the shell sufficiently close to form a tight joint, but is free to slide in and out under pressure, the shoulder $d$ on the gasket bearing against shoulder $a$ at the mouth of the shell to prevent the gasket from being pushed entirely out. It also makes a tighter joint between the gasket and the shell.

Grooved longitudinal guideways C are formed in the outer surface of the shell on opposite sides, having a beveled notch $c^2$ in the bottom of the groove to receive the hook on the spring-latch. Between these guideways are secured spring-latches B, which project beyond the face of the shell and terminate in catch-hook $b$. These springs are so adjusted with relation to the guideways that when the faces of the two shells are brought toward each other with one latch entered into one of the guideways all of the springs will enter corresponding guideways. The gaskets butt against each other before the hooks lock in the notches $c^2$, so that they have to be pressed back on their spring-seats before they can lock. The elasticity of the gaskets themselves and the tension of the springs $g$ pressing them together produce a tight joint. A second notch $c^3$ allows the latch to be locked still farther back to increase the tension, if needed. The notches are beveled somewhat at the front edge, so that when sufficient force is used to overcome the grip of the spring by a straight pull the catch-hooks will unlock and the members separate instead of breaking. This will be facilitated by making the hook beveled slightly also. The amount of force required to separate them will vary with the angle of bevel and strength of spring. They should be locked strong enough, however, not to become separated with ordinary usage, but only when considerable force is applied. It is best to bevel or round off the corners at the entrance to the guideways, both on the bottom at $c$ and on the sides at $c'$, to afford an easy entrance for the latches. Not only do these guideways serve as guides for the latches, but the side walls of the groove steady the spring and prevent all movement of one member upon the other either by twisting or rocking. This is an important feature, and is of such advantage that if one latch becomes broken the other three will still maintain a tight joint. The depth of groove is preferably about equal to the thickness of the spring, so that that portion of the spring in the guideway will lie flush with the surface and cannot be tipped out. The butt-end which is screwed to the shell is also preferably countersunk for the same purpose.

Another advantage of the guideways is protection to the springs, so that they are less liable to get broken than when exposed.

What I claim as my invention is—

1. The combination of a shell A, open throughout its length, a spring-seated gasket inside the shell and projecting beyond its face, grooved longitudinal guideways formed in the rim of the shell and extending from the front face rearward, each groove having in the bottom a beveled notch $c^2$, and spring-latches B on the side of the shell between the grooves, adapted to be received in similar grooves and notches on another like shell, substantially as described.

2. A coupling consisting of two shells A, each having an open passage throughout its length, a spring-seated gasket inside the shell and projecting beyond its face, grooved longitudinal guideways formed in the rim of the shell and extending from the front face rearward, each groove having in the bottom a beveled notch $c^2$, and spring-latches B on the side of the shell between the grooves, adapted to enter the grooves and engage in the notches of the other shell, the two gaskets being thus compressed together and forming a tight joint, substantially as described.

3. A coupling consisting of two shells A, each having an open passage throughout its length, a spring-seated gasket inside the shell and projecting beyond its face, and grooved longitudinal guideways formed in the rim of the shell and extending from the front face rearward, each groove having in the bottom a series of beveled notches, in combination with spring-latches B on the side of the shell between the grooves, adapted to enter the grooves and engage in the notches of the other shell, substantially as described.

CHARLES PARENT.

Witnesses:
WM. A. COPELAND,
LAURITZ N. MÖLLER.